SIGNALING MEANS FOR TELECOMMUNICATION SYSTEMS

Filed March 31, 1953 2 Sheets-Sheet 1

INVENTORS: ROY W. JONES
WILLIAM W. PHARIS
BY T. L. Bowes
ATTORNEY

SIGNALING MEANS FOR TELECOMMUNICATION SYSTEMS

INVENTORS: ROY W. JONES
WILLIAM W. PHARIS
BY T. L. Bowes
ATTORNEY

United States Patent Office 2,832,833

Patented Apr. 29, 1958

2,832,833

SIGNALING MEANS FOR TELECOMMUNICATION SYSTEMS

Roy W. Jones and William W. Pharis, Rochester, N. Y., assignors, by mesne assignments, to General Dynamics Corporation, a corporation of Delaware Application March 31, 1953, Serial No. 345,822

6 Claims. (Cl. 179—17)

Figures 1, 2:
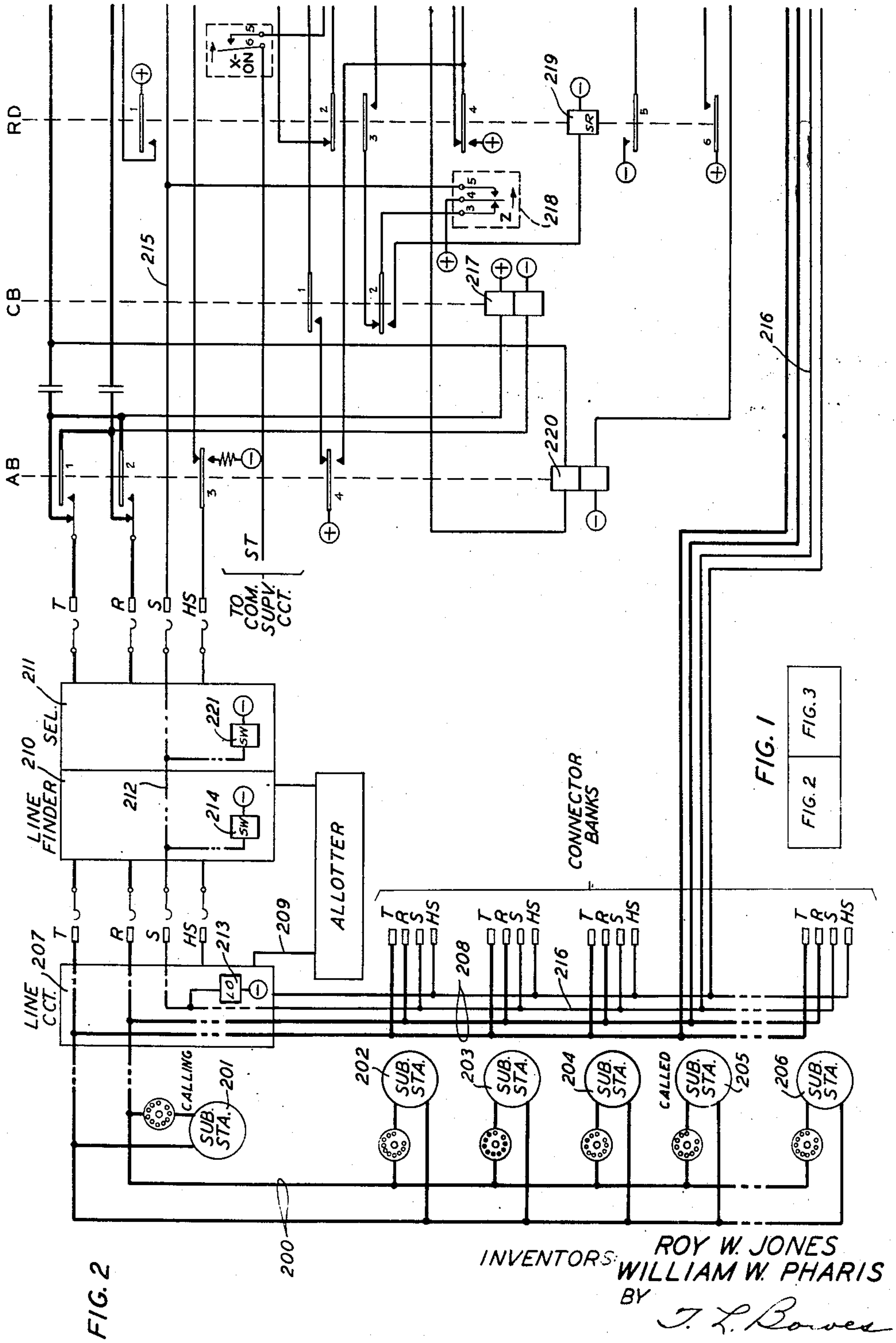

This invention relates to telecommunication systems and particularly to signaling means for notifying a calling subscriber of an operating condition encountered having particularly to do with party line working.

The object of the invention is to provide means for immediately notifying a calling subscriber that he has failed to use the prescribed method or means for making a connection to his own line and has established such a connection but will be unable to make it effective without returning and using the proper method.

In certain telephone systems, particularly in those equipped as community dial offices it is conventional to provide party line service on what is known as a terminal per station basis, that is, each subscriber's station has a different number and although a plurality of such stations may be connected to a single line, there is in the connectors having access thereto a corresponding plurality of line terminals. These line terminals are multipled (with the exception of the terminal which controls the selection of the ringing current) so that the calling subscriber may overlook the fact that the number he may be dialing is connected to the same line as his own. There is a prescribed method of making a call of this particular kind, for it will be realized that the called line will be marked as busy as soon as it is employed as a calling line and some means must be provided for going in over the busy. One conventional method of party line working is for the calling subscriber to dial a prescribed particular digit before dialing the number wanted, in which case the call will be so routed that a connector capable of going in over a busy (when such busy condition is applied as a result of the call being made) is employed. Should the calling subscriber neglect to dial this special preceding digit, then a regular service connector will be employed and as a result the called line will be reported as busy. Heretofore, if the calling subscriber was alert, he was able to make a test to determine if the busy condition reported was genuine or not, and, if not, then he could make the call over again but in the prescribed manner. However, this system is not wholly satisfactory for it burdens the calling subscriber with additional duties, particularly the duty of questioning the genuineness of and seeking a confirmation of a report given him.

The present invention consists of a means for notifying a calling subscriber that he has inadvertently established a connection to his own line without following the prescribed method of making such a call so that he may hang up and make the call in this proper manner. This means is a special tone signal, known as a reverting call tone, which differs from the conventional busy tone alternatively applied. The means for transmitting this tone is controlled at the time the usual busy test of a called line is made, the difference being that in either case the line is tested and found busy and this is immediately followed by a test to ascertain whether the busy condition is genuine or merely the result of a reverting connection.

A feature of the invention is the use of a relay normally short-circuited which is transiently introduced in the holding conductor of the line. In all ordinary situations the relay is immediately energized and locked to control the application of busy tone to the calling line, but where the connection is established to the same line, then by virtue of the fact that both the line finder and the connector employed in the connection are applied to the same holding conductor, the said transient introduction of the relay winding in the holding conductor is prevented by a short circuit, leading from the connector back over the multiple connections of the line to the line finder. This prevents the operation of said relay and hence a reverting call tone, instead of ths usual busy tone, is applied to the calling line. It is to be noted that this roundabout connection is applied and would cause the application of reverting call tone whether the party line is idle or genuinely busy. This, however, is purely hypothetical for if the line is genuinely busy then the line cannot be used for calling purposes and hence it is not possible to misinform a calling subscriber and cause him to go through the prescribed procedure.

Another feature of the invention is a means in a connector circuit for transiently testing the guard wire of the preceding switches to see if the guard placed on the called line after such line has been tested and found idle has been connected over the multipled connections from the called line terminals to the calling line terminals. If the calling and the called lines are one and the same, then the lifting of the guard from the preceding switches will be ineffective and a relay connected between the connection to the preceding switches and the guarding potential will remain shunted. If the called line is not identical with the calling line, then the connection to the preceding switches will be transiently freed of a guard and the said relay will operate and, in doing so, will provide a new guard for the said preceding switches.

Another feature of the invention is a circuit means for controlling a relay by maintaining a shunt on its operating winding. Under normal circumstances this shunt consists of connections to a common point placed on the terminals of this relay at different circuit points. Thereafter one of such connections is opened whereupon the relay will operate unless a genuine loop shunt has been established. In an ordinary connection there will be no loop shunt, but a reverting call connection, since both the line finder and the connector in the one train of switches are connected to the same line, a loop will be completed through such switches and the control wire of the line.

Other features will appear hereinafter.

Figure 3:
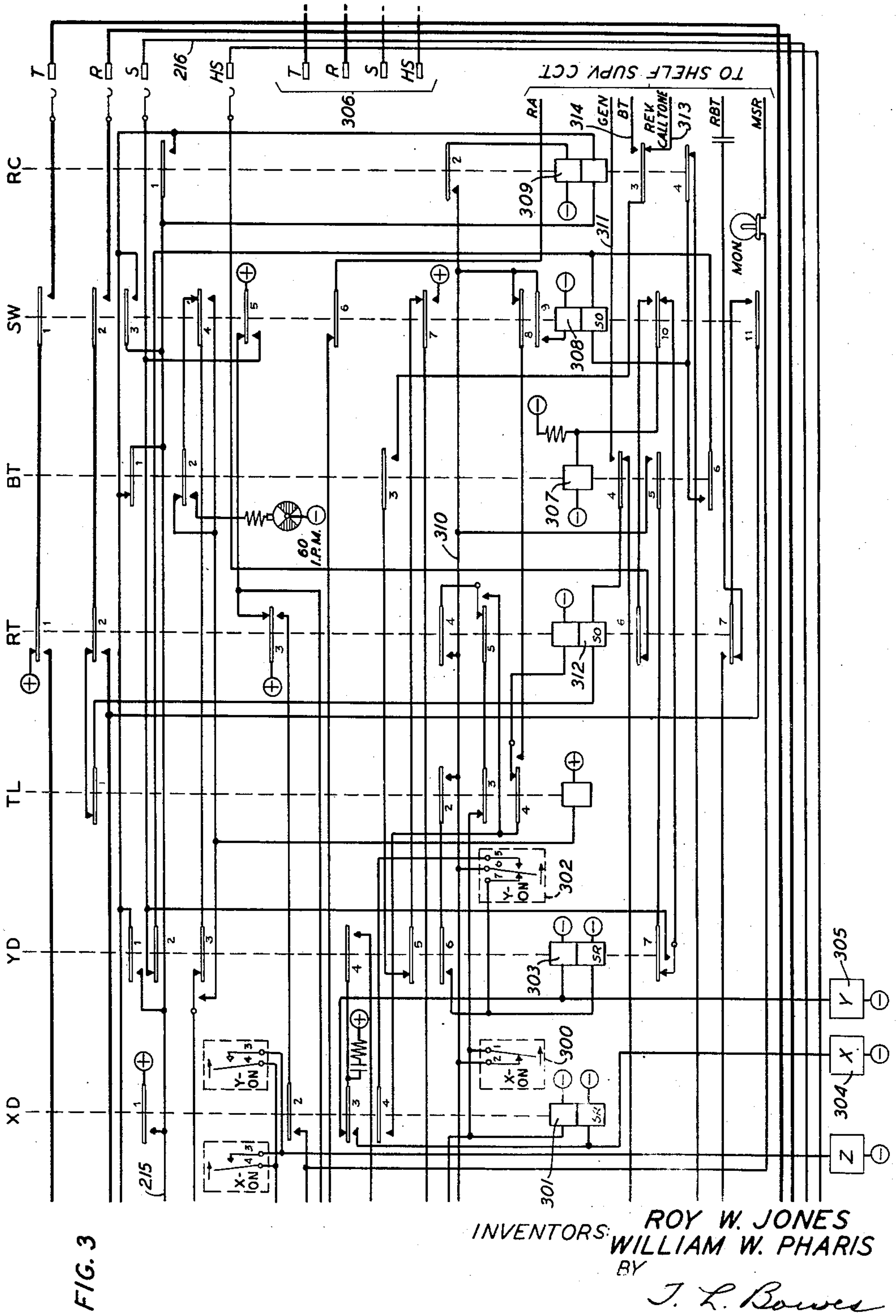

The drawings consist of two sheets having three figures, as follows:

Fig. 1 is a block diagram showing how Figs. 2 and 3 may be placed to provide a complete circuit diagram, Fig. 2 is a schematic circuit diagram showing a party line, a line circuit therefor, a line finder and a selector in block form and a portion of a connector circuit, and Fig. 3 shows the remainder of the connector circuit.

The party 200 is shown with six stations thereon numbered 201 to 206 respectively. The line 200 enters the line circuit 207 and a set of multiple connections 208 lead therefrom. A number of these multiple connections are bracketed as indicating that they lead to sets of terminals in a connector bank, the wires corresponding to the called station 205 actually being carried over into Fig. 3 and being connected to the bank terminals before which the brushes of the connector are poised. When a call is made by the calling substation 201, the allotter wire 209 will be affected in the conventional manner, whereupon the line finder 210 will make connection to the four wires leading from the line circuit and will extend the connection to the selector 211. This selector will operate in response to a set of digital impulses in the conventional manner.

It is to be noted at this time that as the line finder 210 operates to pick up the calling line and the selector 211 is seized, the sleeve wire 212 will be grounded. At that time the LO relay 213 in the line circuit and the SW relay 214 in the line finder will be held by the ground on the sleeve wire 212. It will also be noted in the description to follow that after the selector 211 has seized the connector switch shown mostly in Fig. 3, a ground will be placed on the sleeve conductor 215 within the connector and the SW relay 221 in the selector will also be energized. In the case as shown, the ground on the sleeve conductor 215 will be connected through the sleeve wire 212 thence through the sleeve wire 216 in the connector bank multiple where it will appear on the terminal before which the sleeve brush of the connector is poised.

The connector operates in many respects in the conventional manner. The calling bridge placed on the tip and ring of the calling line will cause the operation of the calling bridge relay 217, whereupon ground (indicated by the symbol (+), the positive terminal of the station battery being grounded) through the springs 4 and 3 of the Z magnet shown in rectangle 218 will be connected through the armature 2 and front contact of the CB relay to the winding of the RD relay 219. The operation of the RD release delay relay 219 establishes a circuit from ground, front contact and armature 4 of the RD relay 219, springs 2 and 1 of the X off-normal contacts shown in rectangle 300, upper winding of the XD slow release relay 301 to battery (indicated by the symbol (—)), whereupon this relay operates. This ground is also extended through springs 6 and 7 of the Y off-normal springs shown in rectangle 302, through the lower winding of the YD slow release relay 303, so that this relay operates. Thus the three slow release relays 219, 301 and 303 immediately become operated when the connector is seized. The connector is now ready to be operated by dial pulses from the calling subscriber's station and this operation will be conventional. The first series of impulses will move the brushes of the connector switch in the primary direction. Upon the first of these impulses as the CB relay 217 releases it will extend the ground on its armature 2, through the armature 3 and front contact of the RD relay 219, the front contact and armature 4 of the YD relay 303, the armature 3 and front contact of the XD relay 301 and thence in a circuit extending in one direction through the lower winding of the XD relay to battery and through the winding of the X magnet 304 to battery. The X magnet will respond to each pulse separately, whereas the XD relay will respond to the train of pulses as a whole. At the end of this series of pulses the XD relay 301 will release and the circuit will be prepared for the movement of the brushes in their secondary direction. Upon the receipt of the next train of pulses these pulses will now be extended over the circuit heretofore traced through armature 4 of the YD relay 303, thence through armature 3 and back contact of the XD relay 301 to a divided circuit extended in one direction through the upper winding of the relay 303 to battery and in another direction through the winding of the Y magnet 305 to battery. This Y magnet responds to each pulse separately to step the brushes in their secondary direction, whereas the YD relay responds to the train as a whole. At the end of this series of pulses the brushes of the connector switch will be placed on the terminals of the called line.

Let it be assumed at this time for purposes of explanation that the brushes have been placed upon the set of terminals 306 leading to some other line and that this line is idle. A circuit will therefore be established from battery, the winding of the busy test relay 307, the armature 10 and back contact of the SW relay 308, the continuity contacts of armature 7 of the YD relay 303, the sleeve brush of the connector to the sleeve terminal of the called line and since this line has been assumed to be idle no circuit for the busy test relay will be completed. In a short interval, measured by the slow releasing characteristics of the YD relay 303, this relay will release whereupon a circuit will be established from ground, armature 6 and front contact of the RD relay 219, back contact and armature 4 of the RC relay 309, lower winding of the SW relay 308, armature 2 and back contact of the YD relay 303, the sleeve brush of the connector sleeve terminal of the called line 306 and thence through the winding of a relay (such as LO) in the line circuit thereof to battery. The SW relay operates and immediately locks through its upper winding, its front contact and armature 9 to ground on the master ground wire 310. Immediately the sleeve of the called line is grounded through armature 5 and front contact of the SW cut-through relay 308.

Thereafter the operations are conventional. The generator lead 311 is connected through the lower winding of the RT ring trip relay 312 and connected to the ring of the called line, return circuit being found over the tip to a ground at the back contact and armature 1 of the RT relay 312. When the called subscriber answers, the RT relay responds, cuts off the source of ringing current and cut sthrough the line to the calling subscriber. The AB answer bridge relay 220 responds to the answer of the called subscriber and reverses the line toward the calling subscriber for the usual supervisory purposes.

Let it be assumed that the calling subscriber 201 on the party line 200 wishes to call the subscriber at called substation 205. It is evident that if the calling subscriber 201 finds his line idle and is able to make the call, any busy condition found thereon is due to his own operations. Therefore, when the calling subscriber drives the connector to the set of terminals before which its brushes are shown poised, the sleeve terminal will be found grounded. This ground may be traced from armature 1 and from contact of the RD relay 219, armature 1 and front contact of the YD relay 303 (holding operated after the last set of digits due to its slow releasing characteristics), sleeve wire 215, sleeve wire 212 in the selector and line finder, sleeve wire 216 in the connector bank terminals to the sleeve terminal poised before the sleeve brush of the connector through the continuity contacts of armature 7 of the YD relay 303, back contact and armature 10 of the SW relay 308, the winding of the BT relay 307 to battery. Thus the BT relay will be operated. In a short space of time measured by the slow releasing characteristics of the YD relay 303, a circuit will be established from ground, armature 1 and front contact of the RD relay 219, lower winding of the tone switching RC relay 309, the sleeve conductor 215 from which ground has been removed at armature 1 and front contact of the YD relay 303, thence over the sleeve wire 212 in the selector and line finder, the sleeve wire 216 in the connector multiple, the sleeve brush of the connector, back contact and armature 2 of the YD relay 303, armature 6 and front contact of the BT relay 307, armature 4 and back contact of the RC relay 309, front contact and armature 6 of the RD relay 219 to ground. Thus it will be apparent that both terminals of the lower winding of the RC relay are grounded at this time, so that the operation of the RC relay is prevented. To recapitulate, a ground on the right hand terminal of the lower winding of the RC relay is found at armature 1 of the RD relay 219 and a ground on the left hand terminal of the lower winding of this relay is found on the sleeve wire 215 coming from the ground on armature 6 of the RD relay 219 and extending through the multiple contact wires of the connection including the sleeve wire 216 and the sleeve wires 212 and 215. The RC relay, therefore, is prevented from operating and the source of reverting call tone 313 connected through the back contact and armature 3 of the RC relay is extended through the front contact and armature 3 of the BT relay 307, the back contact and armature 5 of the YD relay 303, the back contact and armature 7 of the SW relay 308, and the upper winding of the AB answer bridge relay 220 to tip lead T through a suitable DC blocking capacitor. The reverting call tone will therefore be transmitted to the calling subscriber whereupon he may abandon the connection and make the call over again in the prescribed manner.

Assuming for a moment that the brushes of the connector have been placed on the terminals 306 and that this line has been found busy, then ground on the sleeve will operate the BT relay as before. However, when the guard is lifted from the back sleeve by the release of the YD relay 303 (at the armature 1 and front contact of the YD relay) there will be no means for transmitting the ground on the sleeve of the called line back through the multiple and the sleeve wire 215 and hence this latter wire will be left without a solid ground connection for a short interval. Thereupon a circuit is established from ground, armature 1 and front contact of the RD relay 219 through the lower winding of the RC relay 309 to the sleeve wire 215 and the sleeve wire 212 and 216 leading in multiple through the SW relay 221 to battery, the SW relay 214 to battery and the LO relay 213 to battery. The resistance of the lower winding of the RC relay is sufficiently low so that none of these holding means in the selector, the line finder and the line circuit will release. The RC relay 309, however, will immediately operate in this circuit and will lock through its upper winding to the ground on the master ground wire 310. Through this armature 1 and front contact the RC relay will now extend ground from armature 1 and front contact of the RD relay 219 to the sleeve wire 215 whereby the lower winding of the RC relay becomes short circuited. However, the operation of the relay will transfer its armature 3 from the reverting call tone wire 313 on its back contact to the ordinary busy tone wire 314 on its front contact and therefore the calling subscriber will be notified that the called line is busy.

Other operations of this connector are conventional and need not be further described.

What is claimed is:

1. In a telephone system, lines each having multipled terminals appearing before line finders and connectors, a connector controlled from a calling line to establish a connection to a called line having therein a source of busy tone and a source of reverting call tone, means for applying one or the other of said sources of tone to a calling line, said means including a relay for testing the busy or idle condition of a called line, a tone switching relay, means for transiently introducing said tone switching relay in a circuit from a connector terminal of a called line to a line finder terminal of a calling line and circuit means between said line finder and said connector for operating said relay, said relay being shunted and unresponsive to said means when said line finder terminals are multipled to said connector terminals.

2. In a telephone system, a party line having a plurality of stations connected thereto and having a set of terminals per station appearing in connectors having access thereto, a connector having one or more sets of terminals of said party line, each set being designated by a different set of digits, a source of busy tone and a source of reverting call tone, a relay in said connector for switching from said source of busy tone to said source of reverting call tone, means for transiently placing one terminal of said relay in a connection leading to one set of terminals of said line, and means for connecting the other terminal of said relay to a corresponding terminal of a called line whereby said relay will be shunted if the said called line is the calling line by way of a multipled set of terminals of said line.

3. In a telephone system, lines each having multipled terminals including control conductor terminals appearing before line finders and connectors, means including line finders, selectors and connectors controlled from said lines to extend connections to said lines, a source of busy tone and a source of reverting call tone in each said connector, a busy test relay in each said connector, a delay relay in each said connector responsive to impulses for controlling said connector to establish connection to a said line, means including said delay relay for applying said busy test relay to a said called line during the period after a connection has been made to said called line until said delay relay has released, holding means connected to said holding conductor in each said switch preceding said connector, means including said delay relay for applying a holding potential to said holding means, means responsive to the release of said delay relay for disconnecting said holding potential from said holding means and, jointly with said busy test relay, for applying said holding potential to said called line, a relay connected between said holding potential and said connection to said holding means and means responsive to said last relay for switching a calling line from a connection to said source of reverting call tone to said source of busy tone.

4. In a telephone system, lines each having multipled terminals including sleeve terminals appearing before line finders and connectors, means including line finders, selectors and connectors controlled from calling lines to extend connections to called lines, a source of busy tone and a source of reverting call tone in each said connector, said source of reverting call tone being normally connected for application to a calling line, a relay for switching from said source of reverting call tone to said source of busy tone, means for transiently applying said relay to an incoming sleeve wire of said connector and means responsive to a loop circuit between the sleeve of a called line and the sleeve of a calling line provided by the multiple connections of a single line for preventing the operation of said switching relay.

5. In a telephone system, lines each having multipled terminals including control conductor terminals appearing before line finders and connectors, means including line finders, selectors and connectors controlled from calling ones of said lines to extend connections to called ones of said lines, a busy test relay in each said connector, a delay relay in each said connector responsive to impulses for controlling said connector to establish a connection to a said line, means including said delay relay for applying said busy test relay to a said called line during the slow releasing period of said delay relay, an incoming and an outgoing holding connection in said connector, means effective upon the release of said delay relay for placing a guard on said outgoing holding connection and for testing for continuity of a circuit through a multipled control conductor connected to said incoming and said outgoing holding connections, means responsive to failure to find said continuity of circuit for placing an additional guard on said incoming holding connection.

6. In a telephone system, line circuits each having multipled connections appearing before line finders and connectors, line finders, selectors and connectors, said line circuits, said finders and said selectors each having a holding relay therein depending on a sleeve connection extended through the said switches of an established connection, a connector for further establishing a connection to the same or another line circuit, means in said connector for applying a holding connection to said extended sleeve connection, means in said connector responsive to a busy condition in said circuit reached by said connector and means thereupon operative for transiently inserting in said holding circuit in said sleeve circuit back through said established connection of a substitute holding circuit including a revertive call relay and means responsive to said revertive call relay for controlling the type of signal transmitted to a calling subscriber.

References Cited in the file of this patent

UNITED STATES PATENTS

| | | |
|---|---|---|
| 1,625,235 | Bellamy | Apr. 19, 1927 |
| 2,562,555 | Jones | July 31, 1951 |
| 2,633,497 | Denney et al. | Mar. 31, 1953 |